US005883581A

United States Patent [19]

Dorenbosch et al.

[11] Patent Number: 5,883,581

[45] Date of Patent: Mar. 16, 1999

[54] TIME DIVERSITY RADIO SYSTEM USING TRANSPARENT ADDRESS VECTOR AND MESSAGE REPEATS

[75] Inventors: Jheroen Pieter Dorenbosch, Paradise; Terence Edward Sumner, Azle, both of Tex.

[73] Assignee: Motorola, Inc., Schaumburg, Ill.

[21] Appl. No.: 996,175

[22] Filed: Dec. 22, 1997

[51] Int. Cl.[6] .......... H04Q 7/08

[52] U.S. Cl. .......... 340/825.44; 375/267; 375/347; 370/280; 370/314; 370/349; 370/428; 370/429; 371/69.1; 371/33; 340/825.47

[58] Field of Search .......... 340/825.44, 825.47; 370/280, 314, 349, 428, 429; 375/267, 347; 371/69.1, 33

[56] References Cited

U.S. PATENT DOCUMENTS

| | | | |
|---|---|---|---|
| 5,128,665 | 7/1992 | DeLuca et al. | 340/825.47 |
| 5,546,394 | 8/1996 | Eaton et al. | 370/79 |
| 5,657,357 | 8/1997 | Jones et al. | 375/347 |
| 5,794,124 | 8/1998 | Ito et al. | 340/825.44 |

*Primary Examiner*—Brian Zimmerman
*Assistant Examiner*—Yves Dalencourt
*Attorney, Agent, or Firm*—Charles W. Bethards; Pablo Meles

[57] ABSTRACT

A method of decoding a repeat message made up of repeat message fragments at a selective call receiver (122) using a synchronous wireless protocol having time diversity includes the step of decoding (212) a repeat address N times corresponding to the repeat message. Each of the repeats of the address points to a separate repeat of an encoded vector N times wherein each of the repeats of the encoded vector explicitly points to the beginning of a first of the repeated message fragments. The method further includes the step of decoding (212) the repeated message fragments M times which was received on preassigned time slots.

23 Claims, 5 Drawing Sheets

200

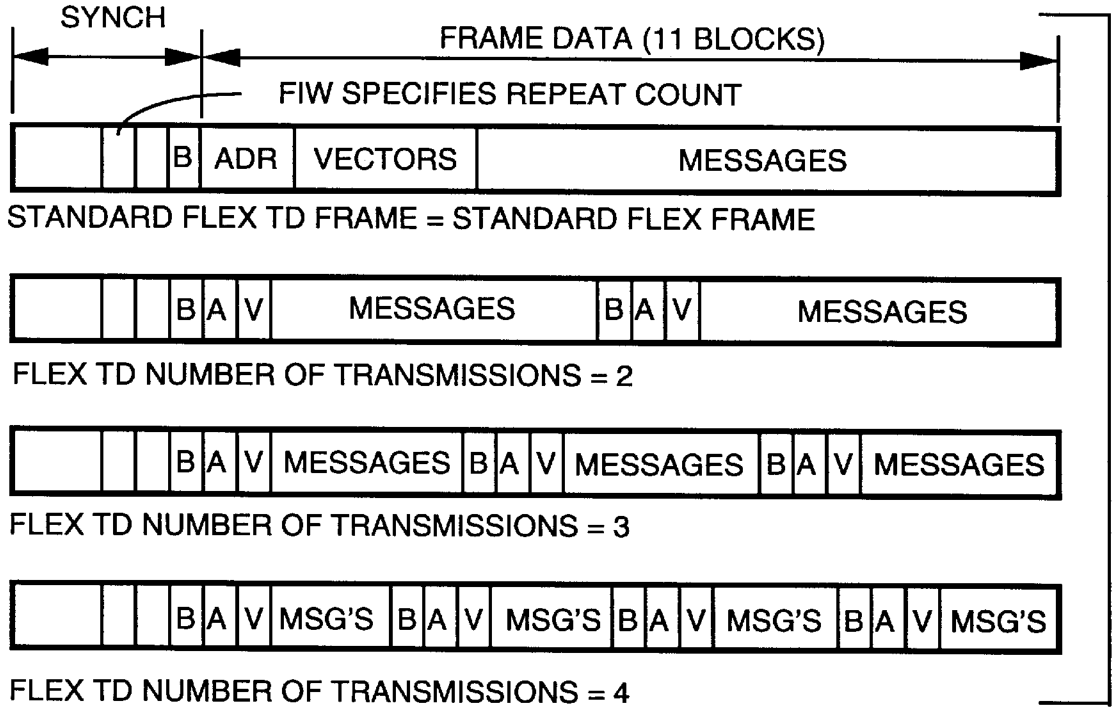
*FIG. 1*
*FIG. 2*
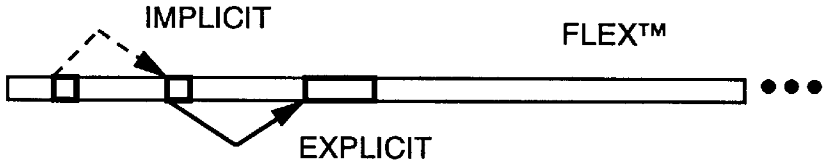
*FIG. 3*
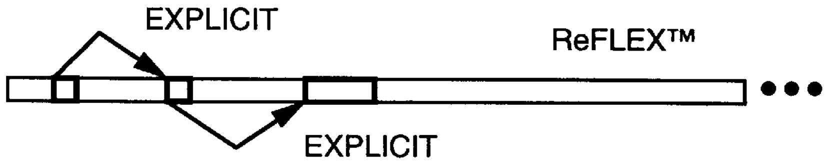
*FIG. 4*
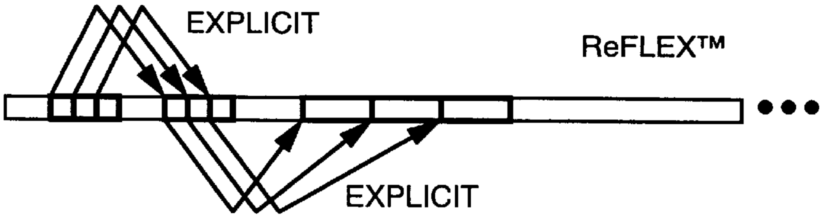

TIME DIVERSITY RADIO SYSTEM USING TRANSPARENT ADDRESS VECTOR AND MESSAGE REPEATS

FIELD OF THE INVENTION

This invention relates generally to a time diversity radio system, and more particularly to a method and apparatus for encoding and decoding messages utilizing inherent addressing and vectoring for repeat messages.

BACKGROUND OF THE INVENTION

In Japan, most paging systems transmit pages more than once to improve paging performance. In general, the multiple transmissions of a message are spaced apart in time. Since a pager on a repeat system is given multiple opportunities to receive the same message in potentially different RF environments (due to the variance of field strength over time and the time difference of transmissions), the pager will gain paging sensitivity. This concept is generally known as time-diversity.

Depending on a selective call receiver's (or pager's) knowledge of the timing of a message's repeats, the pager can "build" a message. Messages can be "built" at various levels within a messaging protocol structure or scheme, including at the page level, at the codeword level, or at the bit level. If a pager knows the timing (128 frames per cycle in Motorola's FLEX™ high speed paging protocol) in which it expects the repeats of a page, it can "build" the message at the page level by selecting the best message of all the repeats it receives. Sequential lockout is used to eliminate multiple alerts for the same message when a preceding message in a time diversity system is received error free. For instance, a pager in a POCSAG system where the message is repeated three times would ignore the second and third repeats if the message was decoded error free on the first repeat or ignore just the third repeat if the message was decoded on the second repeat.

If a pager knows the time frame in which it expects the repeats of a page and can be guaranteed that pages received during that time frame are repeats, it can "build" the message at the codeword level by combining the best message codewords of all the repeats it receives. This type of "building" is referred to as message codeword combining (MCWC) and is currently used in the NTT 1200 signaling scheme in Japan. Finally, if a pager knows the exact time it expects the repeat of a page, it can "build" the page at the codeword level by combining the best of all codewords of all the repeats . Alternatively, the pager could "build" the page at the bit level by combining the best bits of all the codewords (including address and/or vectors) of all the repeats. These two types of "building" are currently supported by FLEX™-TD, the version of FLEX™ used in Japan. They are referred to as codeword combining (CWC) and bit combining (BC).

The disadvantage of such a system is that all messages in a frame are repeated the same number of times, whether they need to be or not. Further, addresses, vectors, and message fragments are all repeated the same number of times, even if they have different length or importance. Hence, what is needed is a different manner of incorporating repeated messages that is preferably backwards compatible with Motorola's Flex™ protocol that can avoid introducing new flags or vectors in existing protocols and allows mixing with non-repeat pagers. Further, the new protocol should allow for different number of repeats for different messages and preferably allows different repeat factors for addresses and data for the same message fragment.

BRIEF DESCRIPTION OF THE DRAWINGS

FIG. 1 is a block diagram of several FLEX™-TD frames in accordance with an existing FLEX™-TD system.

FIG. 2 is a block diagram of a portion of a FLEX™ cycle showing implicit and explicit vectoring in a non-time diversity system.

FIG. 3 is a block diagram of a portion of a ReFLEX™ cycle showing explicit vectoring in a non-time diversity system.

FIG. 4 is a block diagram of a portion of a ReFLEX™ cycle showing explicit vectoring in a system allowing for repeats.

DETAILED DESCRIPTION OF THE INVENTION

Referring to FIG. 1, several FLEX™-TD frames are shown wherein the Frame Information Word (FIW) specifies the repeat count expected. As used in Japan today, FLEX™-TD can send repeats up to 3 times or in other words, up to four transmissions of the same information. As noted above, the FLEX™-TD allows the repetitions of addresses, vectors, and messages in a single frame. This is done by filling only a fraction of the frame and repeating that fraction a number of times (2, 3, or 4 times).

Referring to FIG. 2, a block diagram of a portion of a FLEX™ cycle showing implicit and explicit vectoring in a non-time diversity system is shown. As is well known with respect to FLEX™, the position of the address in the frame implicitly determines the location of the corresponding vector. The location of the message fragment is then explicitly given by the vector. The ReFLEX™ protocol as shown in FIG. 3, is uses explicit information in the vector to locate the message fragment as does the address to explicitly give the vector location. Thus, under the ReFLEX™ protocol, it is possible to have repeats as shown in FIG. 4, but the addresses and vectors would not be exact copies (thus preventing symbol combining).

Figure 5:
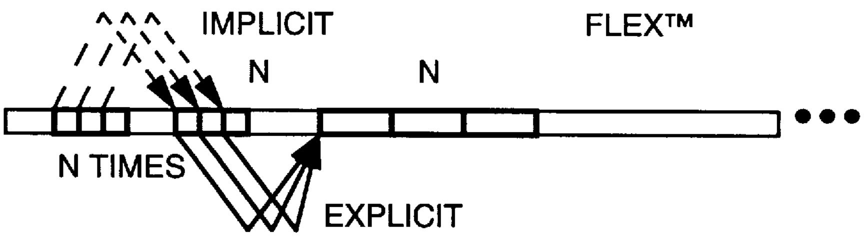
FIG. 5 is a block diagram of a portion of a FLEX™ cycle showing implicit and explicit vectoring in a time diversity system in accordance with the present invention.

Referring to FIG. 5, a first embodiment of the present invention implicitly determines the repeat factor of message fragments being repeated by noting the number of repeated addresses. This embodiment allows for repeated, consecutive encoding of the same address and vector, and of the same message fragment. In FLEX™, the consecutive addresses automatically correspond to the different vectors. Note that since all vectors are exactly the same, they must all point to the first copy of the message fragment.

A pager that incorporates the invention takes special action when it finds its address in a frame. It will check whether previous or following addresses are exact copies. It does the same with all of its vectors. This provides a robust way to discover the repeat factor N. For example, if errors occur in the vectors, the knowledge that there are N exact copies can help during error correction. Since the pager knows that the message fragment is repeated N times as well, error correction is helped by the knowledge of N. Bit or word combining, straight majority voting or weighted majority voting (using RSSI) can then be used in an efficient manner as is well known in the art to select and correct repeated messages.

Figure 8:
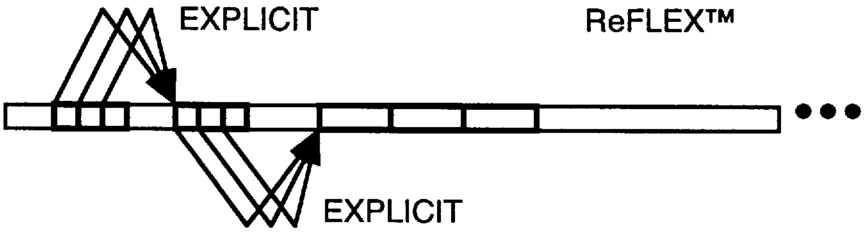
FIG. 8 is a block diagram of a portion of a ReFLEX™ cycle showing explicit vectoring in a time diversity system in accordance with the present invention.

A similar mechanism can be used in ReFLEX™ as shown in FIG. 8. Note however, that all addresses point to the first vector. This construction is allowed under the ReFLEX™ protocol. A selective call receiver that is not aware of the nature of this invention would never discover the extra copies of the vector and of the message fragment. Thus, a selective call system incorporating this invention could be seamlessly incorporated without impairing the function of existing selective call receivers operating within the system.

Figure 6:
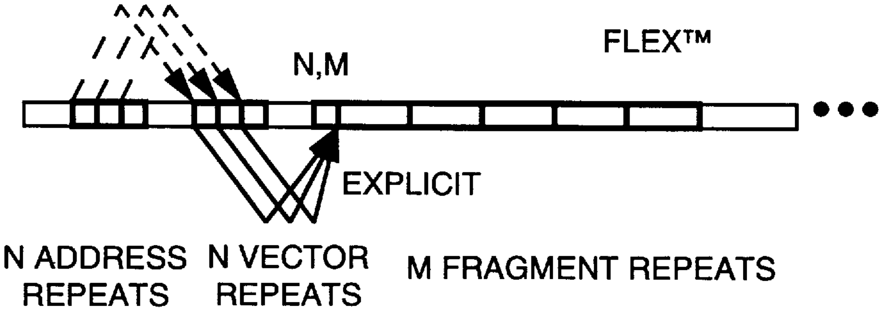
FIG. 6 is a block diagram of a portion of a FLEX™ cycle showing implicit and explicit vectoring in a time diversity system in accordance with the another embodiment of the present invention.

In a second embodiment of the present invention as shown in FIG. 6, it is possible to have a different repeat factor between the message fragment and the address and vector. Preferably, in this embodiment of the present invention, the selective call receiver discovers the repeat factor for the address and vector as above, but it explicitly specifies the fragment repeat factor M. This is done by adding an extra word in the frame that specifies M (for robustness, it may also specify N). A convenient location for the word is just ahead of the first message fragment copy, one word ahead of where all vectors point (for robustness, one may repeat this word N times as well).

Figure 9:
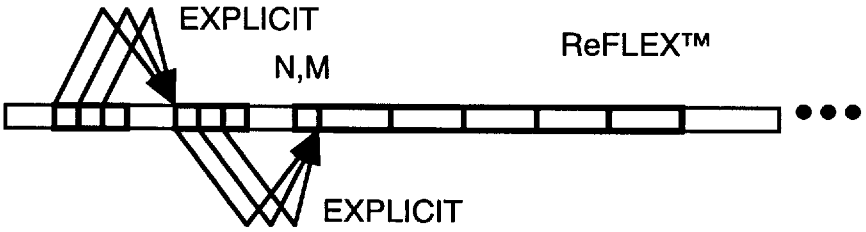
FIG. 9 is a block diagram of a portion of a ReFLEX™ cycle showing explicit vectoring in a time diversity system in another embodiment in accordance with the present invention.

When this scheme is chosen, a selective call receiver that discovers that an address is repeated will look in the agreed location, (just ahead of the message fragment) to determine the fragment repeat factor M (and to check N). It then uses M for robust fragment reception. The same mechanism can be used in ReFLEX™ as shown in FIG. 9.

Figure 7:
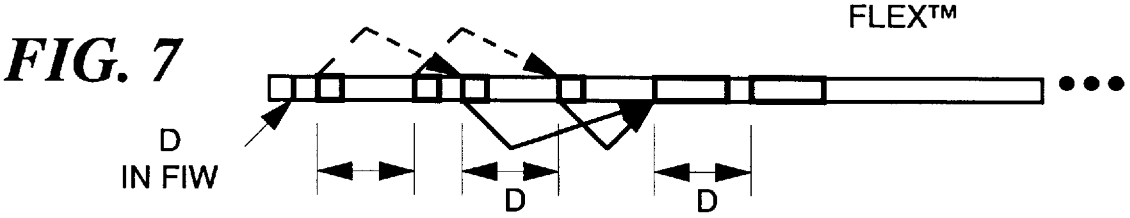
FIG. 7 is a block diagram of a portion of a FLEX™ cycle showing implicit and explicit vectoring in a time diversity system in accordance with the yet another embodiment of the present invention.

In another embodiment shown in FIG. 7, the repeated message fragments repeated "M" times are transmitted on non-adjacent preassigned time slots and a distance defined in terms of "d" timeslots is transmitted immediately preceding the first of the repeat addresses N times which defines a relationship between the repeated addresses, the repeated vectors, and the repeated message fragments allowing for the implicit pointing from addresses to vectors and for the implicit decoding times for the repeated M message fragments on the non-adjacent preassigned time slots.

Figure 10:
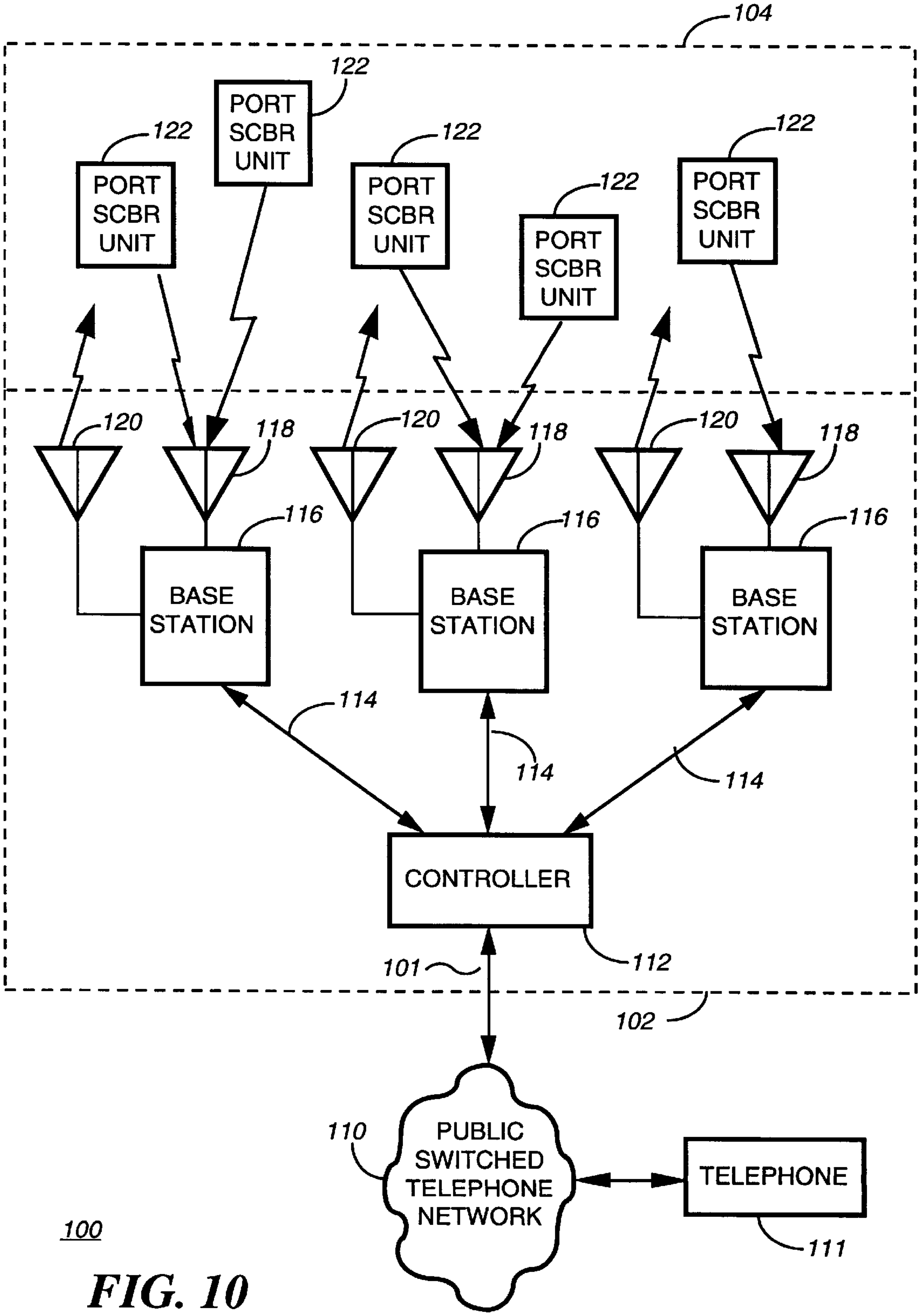
FIG. 10 is an block diagram of a time diversity communication system in accordance with the present invention.

Referring to FIG. 10, a block diagram of a communication system 100 in accordance with the present invention comprises a fixed portion 102 and a portable portion 104. The fixed portion 102 comprises a plurality of conventional base transceivers which are base stations 116 coupled by communication links 114 to a controller 112 for controlling the base stations 116. The hardware of the controller 112 is preferably similar to the RF-Conductor™ messaging controller manufactured by Motorola, Inc. of Schaumburg, Ill. The hardware of the base stations 116 is preferably similar to the RF-Orchestra!™ transmitter manufactured by Motorola, Inc. of Schaumburg, Ill. Other similar hardware can be utilized as well for the controller 112 and base stations 116. The controller 112 comprises a plurality of firmware elements in accordance with the present invention, as will be described further below.

Each of the base stations 116 transmits radio signals to the portable portion 104 comprising a plurality of portable subscriber units 122 via a transmitting antenna 120. The base stations 116 each receive radio signals from the plurality of portable subscriber units 122 via a receiving antenna 118 coupled to a base receiver within the base station (see FIG. 2). The radio signals comprise selective call addresses and messages transmitted to the portable subscriber units 122 and acknowledgments received from the portable subscriber units 122. It will be appreciated that the portable subscriber units 122 can also originate messages other than acknowledgments or can operate solely to receive outbound messages from the base stations, thus operating as a selective call receiver. The controller 112 preferably is coupled to a conventional telephone 111 via telephone links 101 and a public switched telephone network (PSTN) 110 for receiving selective call originations therefrom. Selective call originations comprising voice and data messages from the PSTN 110 can be generated, for example, from the conventional telephone 111 coupled to the PSTN 110 in a manner that is well known in the art.

Data and control transmissions between the base stations 116 and the portable subscriber units 122 and 123 preferably utilize a well-known digital selective call signaling protocol, such as the Motorola FLEX™ family of protocols. It will be appreciated that other similar protocols can be utilized as well. These protocols utilize well-known error detection and error correction techniques and are therefore tolerant to bit errors occurring during transmission, provided that the bit errors are not too numerous in any one code word.

Outbound channel transmissions comprising data and control signals from the base stations 116 preferably utilize two- and four-level frequency shift keyed (FSK) modulation, operating at sixteen-hundred or thirty-two-hundred symbols-per-second (sps), depending on traffic requirements and system transmission gain. Inbound channel transmissions from the portable subscriber units 122 to the base stations 116 preferably utilize four-level FSK modulation at a rate of 800, 1600, 6400 or ninety-six-hundred bits per second (bps). Inbound channel transmissions preferably occur during predetermined data packet time slots synchronized with the outbound channel transmissions. It will be appreciated that, alternatively, other signaling protocols, modulation schemes, and transmission rates can be utilized as well for either or both transmission directions. The outbound and inbound channels preferably operate on a single carrier frequency utilizing well-known time division duplex (TDD) techniques for sharing the frequency. It will be appreciated that, alternatively, frequency division duplex (FDD) can be utilized as well for the outbound and/or inbound channels.

Figure 11:
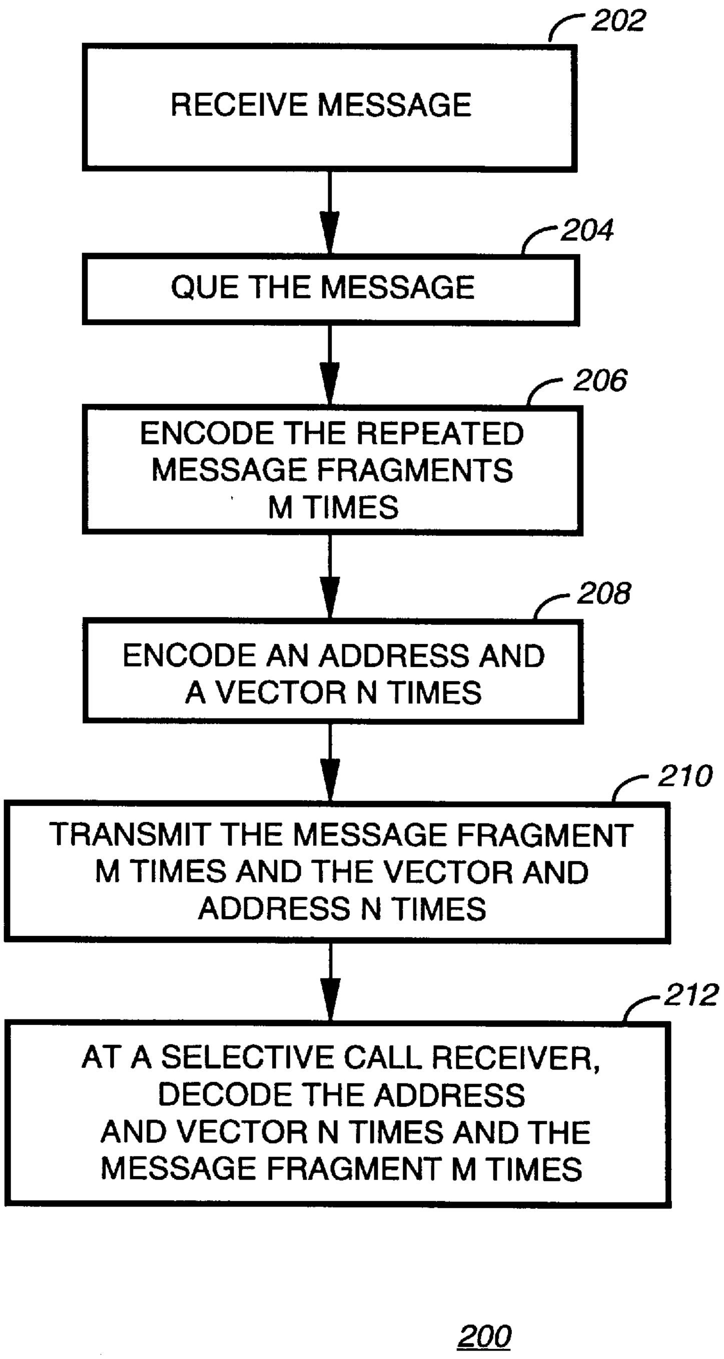
FIG. 11 is a flow diagram illustrating a method in accordance with the present invention.

FIG. 11 illustrates a method 200 in a time diversity paging system having at least one transmitter and at least one of a plurality of selective call receivers where each of the plurality of selective call receivers actively decode on preassigned time slots. The method 200 preferably is specifically a method for encoding (preferably at a controller) and subsequently transmitting (preferably at a base station) a repeated message encoded and transmitted in repeated message fragments. The steps in method 200 preferably comprises the step 202 of receiving a message with address from an information source and the step 204 of queuing the message. Queuing creates a vector upon scheduling the transmission that points to a message fragment. Next, the method preferably includes the step 206 of encoding the repeated message fragments M times on preassigned time slots. Then, at step 208, the method preferably encodes a repeat of an address N times, each of the repeats of the address points to a separate repeat of an encoded vector N times, wherein each of the repeats of the encoded vector explicitly points to the beginning of a first of the repeated message fragments. Of course, as the method progresses in the transmission stage, the method may include the step 210 of transmitting the repeat of the address N times, the encoded vector N times, and the repeated message fragment M times. Finally, if the repeated address, vector and respective message fragment(s) is received at a selective call receiver, the method can proceed with the step 212 of decoding the address and vector N times and the message fragment N times. In one embodiment, the selective call receiver decodes the repeated message fragments N times by implicitly determining that the number of repeat message fragments M=N from counting the repeats of the address N times. In another embodiment, the selective call receiver decodes the repeat message fragments M times by explicitly decoding information representing M immediately preceding the beginning of the first of the repeated message fragments. Preferably, the repeated message fragments M are transmitted on adjacent preassigned time slots. In yet another embodiment, the M repeated message fragments can be transmitted on non-adjacent preassigned time slots separated by a distance d defined in terms timeslots and is transmitted prior to the first of the N-repeated addresses, which defines the relationship among the repeated addresses, the repeated vectors, and the repeated message fragments allowing for the implicit pointing from addresses to vectors and for the implicit decoding times for the repeated M message fragments on the non-adjacent preassigned time slots. In addition, it should be understood that it is preferable that all the repeat addresses, vectors and message fragments be all within the same frame, but the scope of the invention is not necessarily limited thereto.

Figure 12:
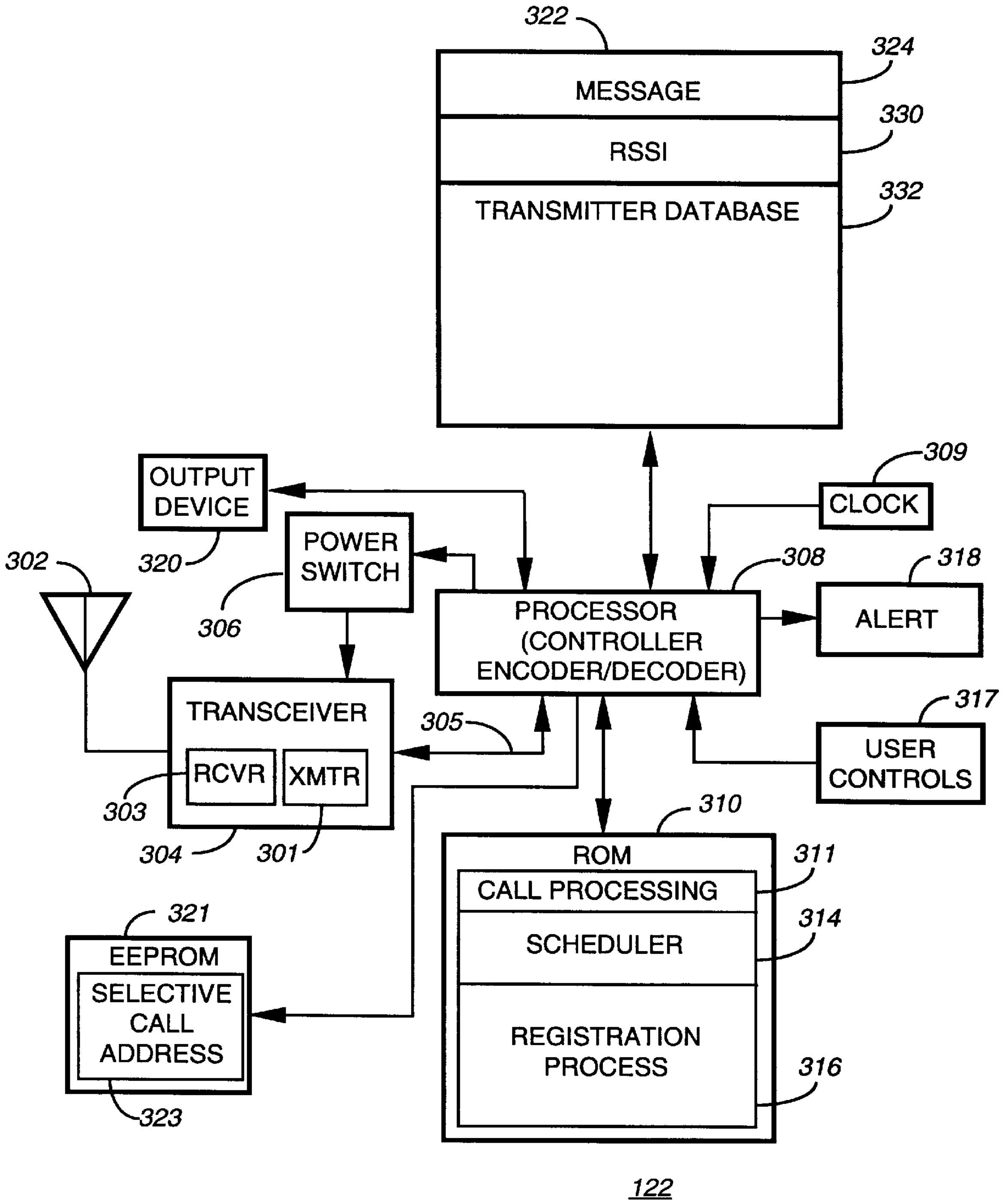
FIG. 12 is an electrical block diagram of a selective call receiver in accordance with the present invention.

Referring to FIG. 12, an electrical block diagram depicts the portable subscriber unit (PSU) 122 in accordance with the present invention. The portable subscriber unit 122 comprises a transceiver antenna 302 for transmitting and intercepting radio signals to and from the base stations 116 (or just a receive antenna in the case of a selective call receiver). The radio signals linked to the transceiver antenna 302 are coupled to a transceiver 304 comprising a conventional transmitter 301 and receiver 303. The radio signals received from the base stations 116 use conventional two and four-level FSK. It will be appreciated by one of ordinary skill in the art that the transceiver antenna 302 is not limited to a single antenna for transmitting and receiving radio signals. Separate antennas for receiving and transmitting radio signals would also be suitable. It should also be appreciated that the present invention works equally well with a one-way receiving device such as a selective call receiver or pager.

Radio signals received by the transceiver 304 produce demodulated information at the output. The demodulated information is transferred over a signal information bus 305 which is coupled to the input of a processor 308, which processes the information in a manner well known in the art. Similarly, acknowledge response messages are processed by the processor 308 and delivered through the signal information bus 305 to the transceiver 304. The acknowledge response messages transmitted by the transceiver 304 are preferably modulated using two-level or four-level FSK operating at a bit rate of 800, 1200, 6400 or ninety-six-hundred bps. It will be appreciated that, alternatively, other bit rates and other types of modulation can be used as well.

A power switch 306, coupled to the processor 308, is used to control the supply of power to the transceiver 304, thereby providing a battery saving function. A clock 309 is coupled to the processor 308 to provide a timing signal used to time various events as required in accordance with the present invention. The processor 308 also is preferably coupled to a electrically erasable programmable read only memory (EEPROM) 321 which comprises at least one selective call address 323 assigned to the portable subscriber unit (PSU) 122 and used to implement the selective call feature. The processor 308 also is coupled to a random access memory (RAM) 322 for storing the following: a message in a plurality of message storage locations 324 that was received at a particular time slot, a received signal strength indicator (RSSI) 330, and a transmitter database 332 that keeps track of the associated measurements to given transmitters. Of course, other information could be stored that would be useful in a two-way messaging system such as zone identifiers and general purpose counters to preferably count calls (to and from the PSU).

In accordance with one aspect of the present invention, the selective call device 122 preferably comprises a selective call receiver in a time diversity system capable of receiving repeat messages transmitted in repeated message fragments. The selective call receiver preferably comprises a receiver module (303) capable of receiving a repeat message M times on preassigned time slots and a decoder module (308) coupled to the receiver module for decoding a repeat address N times corresponding to the repeat message, each of the repeats of the address points to a separate repeat of an encoded vector N times. Preferably, each of the repeats of the encoded vector explicitly points to the beginning of a first of a repeated message fragment. The selective call receiver should also comprise a controller (308) for controlling the decoder module, a sensory alert device (318), and a display device all coupled to the controller. The repeated message fragment is preferably sent on M adjacent preassigned time slots and decoded M times. The selective call receiver also preferably decodes the repeat message fragment N times by implicitly determining that the number of repeat messages M=N from counting the repeats of the address N times. Alternatively, the selective call receiver decodes the repeat message fragment M times by explicitly decoding information representing M immediately preceding the beginning of the first of the repeated message fragments. In this instance M may or may not be equal to N. In yet another embodiment, the M repeated message fragments are received on non-adjacent preassigned time slots and a distance defined in terms of d timeslots is received immediately preceding the first of the repeat N addresses which defines a relationship between the repeated addresses, the repeated vectors, and the repeated message fragments allowing for the implicit pointing from addresses to vectors and for the implicit decoding times for the M repeated message fragments on the non-adjacent preassigned time slots.

The processor 308 also is coupled to a read-only memory (ROM) 310 comprising firmware elements for use by the processor 308. The firmware elements comprise a call processing element 311 for handling of incoming messages on the outbound channel. The call processing element 311 may further comprise routines to determine the current zone that the portable subscriber unit 122 is located in and procedures for updating the current zone identifier. In addition, the firmware elements preferably include a registration process 316. Much of the programming that concerns the present invention could form part of the scheduler 314 and call processing 311, but other embodiments would certainly be contemplated within the scope of the present invention.

Typically, when an address is received by the processor 308, the call processing element 311 compares the received address with at least one selective call address(es) 323, and when a match is detected and a message has been received, a call alerting signal is preferably generated to alert a user that a message has been received. The call alerting signal is directed to a conventional aural, visual or tactile alert device 318 coupled to the processor 308 for generating an aural, visual or tactile call alerting signal. In addition, the call processing element 311 processes the message which preferably is received in a digitized conventional manner, and then stores the message in the message storage location 324 in the RAM 322. The message can be accessed by the user through conventional user controls 317 coupled to the processor 308, for providing functions such as reading, locking, and deleting a message. Alternatively, messages could be read through a serial port (not shown). For retrieving or reading a message, an output device 320, e.g., a conventional liquid crystal display (LCD), preferably also is coupled to the processor 308. It will be appreciated that other types of memory, e.g., EEPROM, can be utilized as well for the ROM 310 or RAM 322 and that other types of output devices, e.g., a speaker, can be utilized in place of or in addition to the LCD, particularly in the case of receipt of digitized voice.

The processor 308 preferably is implemented utilizing a microcomputer similar to the MC68HC11 series microcomputer, manufactured by Motorola, Inc. of Schaumburg, Illinois or other functionally equivalent Digital Signal Processor available from Motorola or Lucent Technologies. It will be appreciated that other similar microcomputers can be used as well for the processor 308, and that the ROM 310, the RAM 322, and/or the EEPROM 321 also can be included as a portion of the processor 308.

It should be understood that the methods described above can be equally applicable in other Time-Diversity systems and is contemplated by the present invention. The present invention has been described in detail in connection with the disclosed embodiments, but these embodiments, however, are merely examples and the invention is not restricted thereto. It will be understood by those skilled in the art that variations and modifications can be made within the scope and spirit of the present invention as defined by the appended claims.

What is claimed is:

1. In a time diversity paging system, having at least one transmitter and at least one of a plurality of selective call receivers where each of the plurality of selective call receivers actively decode on preassigned time slots, a method for encoding for subsequent transmission at a base station a repeated message encoded and transmitted in repeated message fragments, comprising the steps of:

receiving a message from an information source at a base station;

queuing the message;

encoding the repeated message fragments M times on preassigned time slots; and encoding a repeat of an address N times, each of the repeats of the address points to a separate repeat of an encoded vector N times, where M or N are greater than 1, wherein each of the repeats of the encoded vector explicitly points to the beginning of a first of the repeated message fragments.

2. The method of claim 1, wherein the method further comprises the step of transmitting the repeat of the address N times, the encoded vector N times, and the repeated message fragment M times.

3. The method of claim 2, wherein a selective call receiver decodes the repeated message fragments N times by implicitly determining that the number of repeat message fragments M=N from counting the repeats of the address N times.

4. The method of claim 2, wherein a selective call receiver decodes the repeat message fragments M times by explicitly decoding information representing M immediately preceding the beginning of the first of the repeated message fragments.

5. The method of claim 2, wherein the repeated message fragments M are transmitted on adjacent preassigned time slots.

6. The method of claim 2, wherein the M repeated message fragments are transmitted on non-adjacent preassigned time slots and a distance defined in terms of d timeslots is transmitted immediately preceding the first of the repeat addresses N times which defines a relationship between the repeated addresses, the repeated vectors, and the repeated message fragments allowing for the implicit pointing from addresses to vectors and for the implicit decoding times for the repeated M message fragments on the non-adjacent preassigned time slots.

7. The method of claim 1, wherein the steps of encoding further comprise encoding the repeated message fragments, the repeated addresses, and the repeated vectors within a single frame.

8. A method of encoding a message for repeated transmission in a time diversity system, comprising the steps of:

encoding the message into message fragments and repeating the message fragments M times on adjacent preassigned time slots;

encoding a repeat of an address N times corresponding to the message, each of the repeats of the address points to a separate repeat of an encoded vector N times, where M or N are greater than 1, wherein each of the repeats of the encoded vector explicitly points to the beginning of a first of the repeated message fragments.

9. The method of claim 8, wherein the method further comprises the step of transmitting the repeat of the address N times, the encoded vector N times, and the repeated message fragments M times.

10. The method of claim 9, wherein a selective call receiver decodes the repeat message fragments N times by implicitly determining that the number of repeat message fragments M=N from counting the repeats of the address N times.

11. The method of claim 9, wherein a selective call receiver decodes the repeat message fragments M times by explicitly decoding information representing M immediately preceding the beginning of the first of the repeated message fragments.

12. The method of claim 8, wherein each of the repeats of the address implicitly points to a separate repeat of an encoded vector N times.

13. The method of claim 8, wherein each of the repeats of the address explicitly points to a separate repeat of an encoded vector N times.

14. A method of decoding a repeat message made up of repeat message fragments at a selective call receiver using a synchronous wireless protocol having time diversity, comprising the steps of:

decoding a repeat address N times corresponding to the repeat message, each of the repeats of the address points to a separate repeat of an encoded vector N times, where M or N are greater than 1, wherein each of the repeats of the encoded vector explicitly points to the beginning of a first of the repeated message fragments;

decoding the repeated message fragments M times which was received on preassigned communication resources.

15. The method of claim 14, wherein the preassigned communication resources are adjacent preassigned time slots.

16. The method of claim 14, wherein the selective call receiver decodes the repeat message fragments N times by implicitly determining that the number of repeat message fragments M=N from counting the repeats of the address N times.

17. The method of claim 14, wherein a selective call receiver decodes the repeat message fragments M times by explicitly decoding information representing M immediately preceding the beginning of the first of the repeated message fragments.

18. The method of claim 14, wherein the M repeated message fragments are received on non-adjacent preassigned time slots and a distance defined in terms of d timeslots is transmitted immediately preceding the first of the repeat addresses N times defines a relationship between the repeated addresses, the repeated vectors, and the repeated message fragments allowing for the implicit pointing from addresses to vectors and for the implicit decoding times for the repeated M message fragments on the non-adjacent preassigned time slots.

19. In a time diversity system, a selective call receiver capable of receiving repeat messages transmitted in repeated message fragments, the selective call receiver comprising:

a receiver module capable of receiving a repeat message M times on preassigned time slots;

a decoder module coupled to the receiver module for decoding a repeat address N times corresponding to the repeat message, each of the repeats of the address points to a separate repeat of an encoded vector N times, where M or N are greater than 1, wherein each of the repeats of the encoded vector explicitly points to the beginning of a first of a repeated message fragment; and a controller for controlling the decoder module, a sensory alert device, and a display device all coupled to the controller.

20. The selective call receiver of claim 19, wherein the decoder decodes the repeated message fragment M times which was received on adjacent preassigned time slots.

21. The selective call receiver of claim 20, wherein the selective call receiver decodes the repeat message fragment N times by implicitly determining that the number of repeat messages M=N from counting the repeats of the address N times.

22. The selective call receiver of claim 20, wherein a selective call receiver decodes the repeat message fragment M times by explicitly decoding information representing M immediately preceding the beginning of the first of the repeated message fragments.

23. The selective call receiver of claim 19, wherein the M repeated message fragments are received on non-adjacent preassigned time slots and a distance defined in terms of d timeslots is received immediately preceding the first of the repeat addresses N times which defines a relationship between the repeated addresses, the repeated vectors, and the repeated message fragments allowing for the implicit pointing from addresses to vectors and for the implicit decoding times for the M repeated message fragments on the non-adjacent preassigned time slots.

* * * * *